United States Patent

Gonzalez et al.

(10) Patent No.: US 7,800,339 B2
(45) Date of Patent: Sep. 21, 2010

(54) DRIVE CONTROL ASSEMBLY FOR CONTROLLING A MOTOR

(75) Inventors: Steven P. Gonzalez, Hugo, MN (US); Robert L. Sundberg, Corcoran, MN (US)

(73) Assignee: Honeywell International Inc., Morristown, NJ (US)

( * ) Notice: Subject to any disclaimer, the term of this patent is extended or adjusted under 35 U.S.C. 154(b) by 307 days.

(21) Appl. No.: 11/561,811

(22) Filed: Nov. 20, 2006

(65) Prior Publication Data

US 2008/0116830 A1    May 22, 2008

(51) Int. Cl.
*H02P 27/04* (2006.01)

(52) U.S. Cl. ............ 318/807; 318/268; 318/779; 318/799

(58) Field of Classification Search ........... 62/225; 361/23, 8, 13, 301.2, 662; 318/807, 811, 318/723, 147, 803, 268, 400.01, 700, 779, 318/799, 800
See application file for complete search history.

(56) References Cited

U.S. PATENT DOCUMENTS

| | | | | |
|---|---|---|---|---|
| 4,487,363 A * | 12/1984 | Parker et al. | ............... | 236/49.3 |
| 5,130,628 A * | 7/1992 | Owen | ..................... | 318/780 |
| 5,422,550 A * | 6/1995 | McClanahan et al. | ......... | 318/91 |
| 5,522,707 A * | 6/1996 | Potter | ..................... | 417/4 |
| 5,646,458 A * | 7/1997 | Bowyer et al. | ............... | 307/67 |
| 5,721,449 A * | 2/1998 | Panuce | ..................... | 200/16 A |
| 6,118,392 A * | 9/2000 | Levine | ..................... | 341/60 |
| 6,121,749 A * | 9/2000 | Wills et al. | ..................... | 318/811 |
| 6,160,365 A | 12/2000 | Youngner et al. | | |
| 6,316,896 B1 | 11/2001 | Tikkanen et al. | | |
| 6,864,659 B2 | 3/2005 | Ratz et al. | | |
| 7,081,735 B1 * | 7/2006 | Malkowski et al. | ......... | 318/807 |
| 7,227,326 B1 * | 6/2007 | Lu et al. | ..................... | 318/461 |
| 7,248,015 B2 * | 7/2007 | Byrnes et al. | ............... | 318/751 |
| 7,477,037 B2 * | 1/2009 | Amorino et al. | ............ | 318/803 |
| 2004/0252423 A1* | 12/2004 | Boren | ..................... | 361/23 |
| 2005/0035664 A1* | 2/2005 | Zver et al. | ..................... | 307/115 |
| 2006/0130501 A1* | 6/2006 | Singh et al. | ..................... | 62/183 |
| 2007/0289332 A1* | 12/2007 | Petitfrere | ..................... | 65/382 |

OTHER PUBLICATIONS

ABB Inc., "AC Drives ACH 550," pp. 1-40, Aug. 9, 2004.
ABB Inc., "ABB drives for HVAC applications," pp. 1-8, Jun. 24, 2004.
Eaton Corporation, "HVX IntelliPass," pp. 1-6, Jan. 2004.
Johnson Controls, "VS Series Variable Speed IntelliPass Drives," pp. 1-13, Jul. 2004.
Rockwell Automation, "PowerFlex 7000," pp. 1-4, Jul. 2004.
RAM Idustries LLC, "Cooling Tower Control Panels," pp. 1-4, Mar. 25, 2005.

(Continued)

*Primary Examiner*—Bentsu Ro
*Assistant Examiner*—Antony M Paul
(74) *Attorney, Agent, or Firm*—Crompton Seager & Tufte LLC

(57) ABSTRACT

A drive control assembly for a motor including a variable frequency drive module for providing variable speed control for the motor, a bypass module for providing bypass control for the motor, and a switch for switching control for the motor between the variable frequency drive module and the bypass module. The bypass module can provide control for the motor even when the variable frequency drive module is removed from the drive control assembly.

14 Claims, 9 Drawing Sheets

OTHER PUBLICATIONS

Reliance Electric, "Instruction Sheet D2-3084," pp. 1-8, Dec. 1985.

Siemens, "VFD E-Bypass 101 The Basics," pp. 1-2, 2004.

Siemens, "SED2 Variable Frequency Drives with Conventional Bypass Option," Installation Instructions, Document No. 129-374, pp. 1-10, Mar. 17, 2005.

Siemens, "SED2 Variable Frequency Drives with Electronic (E) Bypass Options," Installation Instructions, Document No. 129-373, pp. 1-11, Oct. 10, 2003.

Siemens, "Enclosure Ratings and Their Applications," Technical Bulletin, Document No. 155-756, pp. 1-4, Jan. 14, 2005.

Siemens, "Variable Frequency Drives," pp. 1-5, 2006.

Siemens, HVAC Products, Introducing the SED2 Variable Frequency Drives, pp. 1-8, Mar. 2002.

Siemens, Building Technologies, "SED2 Variable Frequency Drives," pp. 1-6, prior to Nov. 20, 2006.

Johnson Controls, "Variable Speed Drives with IntelliPass," pp. 1-2, May 2004.

PSU University Park Campus, "Variable Frequency Drive Specification," pp. 1-4, Jun. 3, 2002.

* cited by examiner

DRIVE CONTROL ASSEMBLY FOR CONTROLLING A MOTOR

FIELD

The present invention generally relates to drive control assemblies, and more particularly, to drive control assemblies for controlling motors.

BACKGROUND

There is widespread use of electric motors to control the actuation or movement of parts or components within various systems. Such systems include, for example, manufacturing systems, Heating, Ventilation, and Air Conditioning (HVAC) systems, as well as a host of other systems. For example, HVAC systems typically provide heating, cooling, ventilation and/or air handling within buildings or structures. In many cases, such HVAC systems incorporate the use of electric motors to achieve the desired air handling, flow control, and/or other functions of the HVAC system. For example, electric motors may be used to drive fans, blowers, actuators, pumps, valves, mixers, and the like.

A drive control assembly is often used to control the drive current that is provided to the electric motors. In some cases, Variable Frequency Drives (VFDs) are included in the drive control assembly to control the speed of the electric motor. The use of VFDs can often significantly increase the efficiency of a system, such as an HVAC system, by not requiring that the motor (e.g. fan motors) to be driven at full speed all the time. The VFD may drive the motor at an appropriate speed, depending on the current conditions and/or needs. In some cases, the VFDs can include a control module having control electronics and/or software, and in some cases a user interface, to allow the user to control the operation of the VFD, and thus the motor.

VFDs can fail in the field for any number of reasons. When a VFD fails, the corresponding motor(s) can stop or otherwise not be controlled properly, which can have a significant impact on the operation of the overall system. For example, if a VFD controlling a main fan of an HVAC system fails, the main fan may stop operating and the heated, cooled and/or ventilation air may not be delivered to the building as expected. To help combat this, many VFDs are coupled to or include a bypass function. The bypass function, when activated, provides power to the motor so that the motor can continue to operate, often at full speed, even after the VFD fails. In some cases, an operator must detect the failure of the VFD, and then manually activate the bypass function via a switch or push a button. In other cases, a control module for the VFD may automatically detect the failure in the VFD, and automatically activate the bypass function.

In many cases, the bypass function requires the presence of the VFD in order to provide proper bypass power to the motor. A problem arises when the VFD must be removed, such as for maintenance and/or replacement. During such times, the bypass function may need to be removed or deactivated, which causes the corresponding motor(s) to also be deactivated. This may be particularly detrimental in those systems where continuous operation of the motor(s) is desired or required. Therefore, it would be desirable to provide a bypass function that can remain fully functional when the VFD module is removed, replaced and/or otherwise not operational.

SUMMARY

The following summary is provided to facilitate an understanding of some of the innovative features unique to the present invention and is not intended to be a full description. A full appreciation of the invention can be gained by taking the entire specification, claims, drawings, and abstract as a whole.

The present invention generally relates to drive control assemblies, and more particularly, to drive control assemblies for controlling motors. In one illustrative embodiment, a drive control assembly includes a VFD and a bypass module. A mechanical switch may be provided for switching control for the motor between the VFD module and the bypass module. Alternatively, or in addition, a controller may be provided in the VFD, the bypass module, or external to the VFD and bypass module for automatically switching control for the motor between the VFD module and the bypass module. In some cases, the bypass module is adapted to provide power to the motor even when the VFD module is removed from the drive control assembly. In some cases, the VFD module can be removed from the drive control assembly without removing the bypass module from the drive control assembly.

BRIEF DESCRIPTION

The invention may be more completely understood in consideration of the following detailed description of various illustrative embodiments of the invention in connection with the accompanying drawings, in which.

DETAILED DESCRIPTION

Figure 1:
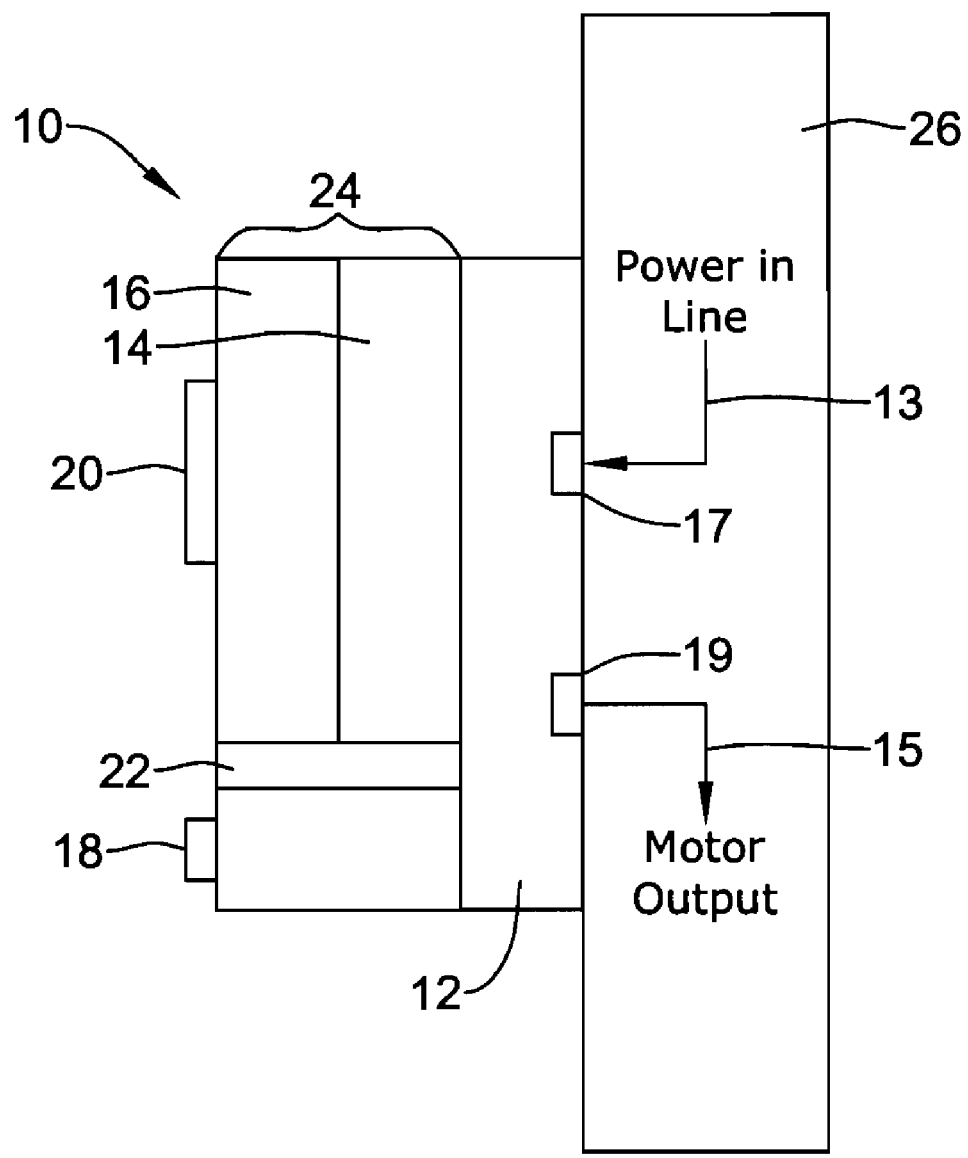
FIG. 1 is a schematic diagram of a side view of an illustrative drive control assembly according to one embodiment of the present invention.

The following description should be read with reference to the drawings wherein like reference numerals indicate like elements throughout the several views. The detailed description and drawings show several embodiments which are meant to be illustrative of the claimed invention.

FIG. 1 is a schematic diagram a side view of a drive control assembly 10 in accordance with one illustrative embodiment of the present invention. The drive control assembly 10 provides control for a motor (not shown). In some embodiments, the motor may be part of a Heating, Ventilation, and Air Conditioning (HVAC) system, but this is not required. For example, the motor may move a fan, a blower, an actuator, a pump, a valve, a mixer, and any other motor operated component of an HVAC system. In an HVAC system, the motor can be, for example, a 480 volt alternating current (AC) motor, a 220 volt alternating current (AC) motor, or a 110 volt alternating current (AC) motor. However, it is contemplated that the illustrative drive control assembly 10 may control any suitable motor, depending on the application.

In the illustrative embodiment shown in FIG. 1, the drive control assembly 10 includes a VFD module 24, a bypass module 12, and a mechanical and/or electromechanical switch 18. The VFD module 24 may provide variable speed control to the motor (not shown) by variably controlling the frequency, current and/or voltage that is applied to the motor.

For example, and for illustrative purposes, the VFD module 24 may initially, at start up, apply a lower frequency and voltage to the motor. In some cases, the lower frequency can be around 2 Hz or less, but any frequency may be used, as desired. The lower frequency may help to protect the motor by helping to prevent a high inrush of current to the motor coils at start up. Then, the VFD module 24 may ramp up the frequency and the voltage to accelerate the speed of the motor. In some cases, the ramping up may be performed at a controlled rate, however, any method of ramping up the motor may be used, if desired. In many cases, the frequency and the voltage applied to the motor may be ramped up until the motor reaches a desired motor speed. Similarly, when the motor is to be slowed down or turned off, the VFD module 24 may ramp down the frequency and the voltage applied to the motor, but this is not required.

In the illustrative embodiment, the VFD module 24 includes a power module 14 and a control module 16. However, it is contemplated that the control module 16 may be provided separate from the VFD module 24 in some embodiments. The control module 16 may control the operation of the VFD module 24 and/or the bypass module 12. For example, the control module 16 may control the start-up frequency and voltage of the VFD module 24, the ramp up rate of the frequency and the voltage to the motor, the desired voltage and frequency of the VFD module 24 to achieve a desired motor speed, the ramp down rate of the frequency and the voltage to the motor, the shut down frequency and voltage of the motor, as well as any other suitable control parameter(s). Additionally, in some cases, the control module 16 may control when the VFD module 24 turns the motor on and off, the duration that the VFD module 24 operates the motor, such as the run time, the speed at which the motor operates at any given time, and/or any other operating parameter of the VFD module 24, depending on the application. The power module 14 may be part of the VFD module 24 that provides the variable speed power to the motor, as discussed previously.

In certain embodiments, the control module 16 may also include a control panel 20 that includes a user interface, such as, for example, a keypad, a display screen, indicator lights, and/or the like. The control module 16 may control the operation of the VFD module 24 according to user inputs via the user interface. In some embodiments, the user interface may be provided adjacent to the control module 16. In other embodiments, the user interface may be provided remote from the control module 16. In these embodiments, the user interface may be in communication with the control module 16 via, such as, a bus, a wireless interface, an intranet, the Internet, or any other suitable interface, as desired. In some cases, the user interface may be configured to control two or more control modules 16, but this is not required. Also, it is contemplated that a single control module 16 may be configured to control two or more power modules 14, but this is not required.

In the illustrative embodiment shown in FIG. 1, the bypass module 12 of the drive control assembly 10 is configured to provide bypass control to the motor (not shown). In some cases, the bypass module 12 simply connects the input power line 13 to the terminals of the motor, and thus the motor turns at a non-variable speed such as full speed. However, in other cases, the bypass module 12 may provide control at a speed less than full speed, if desired. Furthermore, it is contemplated that a variable speed bypass may be provided, if desired.

The drive control assembly 10 of FIG. 1 also includes a mechanical switch 18 for switching control for the motor between the VFD module 24 and the bypass module 12. In some cases, the mechanical switch 18 may be provided in or adjacent to the bypass module 12, however, this is not required. In certain embodiments, the mechanical switch 18 may be a multi-position switch. The multi-position switch may have at least a first position and a second position. The first position may provide control to the motor from the VFD module 24, and the second position may provide control to the motor from the bypass module 12. In other words, the multi-position switch may control which part of the drive control assembly 10 controls the motor. Furthermore, it is contemplated that the multi-position switch may have more positions, such as a third position to test the VFD module 24, a fourth position to shut off power to the drive control assembly 10 altogether, or any other position(s), depending on the application. Additionally, it is contemplated that in some embodiments, the mechanical switch 18 may include a plurality of switches to change the control of the motor, as desired. Also, it is contemplated that the mechanical switch may be an electrical or electromechanical switch (e.g. relay, Triac, transistor(s), etc.), which can be controlled electrically from a local or remote location, as desired.

In the illustrative embodiment of FIG. 1, the drive control assembly 10 may be wall 26 mountable. When mounted to a wall 26, the bypass module 12 may be mounted to or adjacent the wall 26. The VFD module 24, including the power module 14 and the control module 16 in the illustrative embodiment, may be mounted or secured to the bypass module 12. In some cases, the VFD module may be secured to the bypass module 12 as a whole with both the power module 14 and the control module 16 mounted at the same time. In other cases, the power module 14 and control module 16 may be mounted to the bypass module 12 separately, either the power module 14 mounted to the bypass module 12 and the control module 16 mounted to the power module 14, or the control module mounted to the bypass module 12 and the power module 14 mounted to the control module 16. Additionally, it is contemplated that both the control module 16 and the power module 14 may be mounted or secured to the bypass module 12, if desired.

In some cases, the drive control assembly 10 may also include a wire duct 22 to accommodate wired connections between the VFD module 24, control module 16 and/or the bypass module 12, but this is not required. In some cases, and as illustrated in FIG. 1, the bypass module 12 may extend out below the VFD module 24, and the wire duct 22 may be positioned between the VFD module 24 and the extended portion of the bypass module 12.

The bypass module 12 may include an input port 17 that is electrically connected to a power in line 13. Likewise, the bypass module 12 may include an output port 19 that is electrically coupled to one or more motors via drive output 15. In some cases, the VFD module 24 may be electrically and mechanically connected to the bypass module 12. The electrical connection between the VFD module 24 and the bypass module 12 may be configured to allow the VFD module 24 to receive power from the power in line 13, and to provide a variable drive output signal to the motor via drive output 15.

In the illustrative embodiment, the VFD module 24 may be removable from the drive control assembly 10 without removing the bypass module 12 from the drive control assembly 10. That is, and in some cases, the bypass module 12 may remain secured to a wall 26 or the like when the VFD module 24 is removed for repair or replacement. Additionally, because the bypass module 12 is coupled to the power in line 13 and to the motor via the input 17 and output 19 ports, when the VFD module 24 is removed from the drive control assembly 10, the bypass module 12 may continue to provide power to the motor.

The illustrative embodiment shown in FIG. 1 may be relatively small and compact. The illustrated arrangement of mounting the VFD module 24 to the bypass module 12 may provide a relatively smaller foot print on the mounting surface, and thus may require relatively less wall 26 space for the drive control assembly 10. Additionally, because in some cases, more wall 26 space can amount to more cost, the control drive assembly may decrease the overall system cost. In some cases, the wall 26 space required can be reduced be approximately 50 percent or more. However, this reduction may depend on the desired application.

In some cases, the drive control assembly 10 may be adapted to be mounted to the floor. Such a drive control assembly 10 may be similar to the wall 26 mountable drive control assembly 10 shown in FIG. 1, except that the bypass module 12 may configured to be mounted to the floor. In some cases, the VFD module 24 may still be removable from the drive control assembly 10 without removing the bypass module 12 from the floor.

In operation, the illustrative drive control assembly 10 can provide control for one or more motors. The VFD module 24 can provide variable speed control for a motor, and the bypass module 12 can provide bypass control for the motor. In some cases, a mechanical, electrical and/or electromechanical switch 18 can be used to switch control of the motor between the VFD module 24 and the bypass module 12. For example, when the switch is a mechanical switch operatable by an operator, a first position of the switch 18 may provide control to the motor from the VFD module 24, and a second position may provide control to the motor from the bypass module 12. When the switch 18 is positioned in the second position, providing bypass control to the motor, the VFD module 24 may be detached from the drive control assembly 10, and the device control assembly 10 can still provide power to the motor via the bypass module 12.

Under most circumstances, the VFD module 24 may provide control to the motor. However, when the VFD module 24 is not able to provide control to the motor, for example due to VFD module failure, service needs, reprogramming, or for any other reasons, the bypass module 12 can be switched to provide control to the motor. Once the bypass module 12 is providing control, the VFD module 24 can be removed from the drive control assembly 10, all without interrupting power to the motor.

One illustrative method of operating the drive control assembly may include supplying power to the motor via the variable frequency drive module 14, switching the switch 18, supplying power to the motor via the bypass module 12, and removing the variable frequency drive module 14 from the drive control assembly 10 without interrupting power to the motor via the bypass module 12. In some cases, the power to the motor may be temporarily disrupted to remove the VFD module 14 from the drive control assembly 10 and then, after the VFD module 14 is removed, power may be restored to the motor via the bypass module 12. In some cases, it may also include continuing to operate the motor with the bypass module 12 when the VFD module 14 is removed. Also, the bypass module 12 may not need to be removed when the variable frequency drive module is removed. In some cases, operation may also include attaching the variable frequency drive module to the drive control assembly 10 and switching the switch 18 to supply power to the motor from the VFD module 24.

Figure 2:
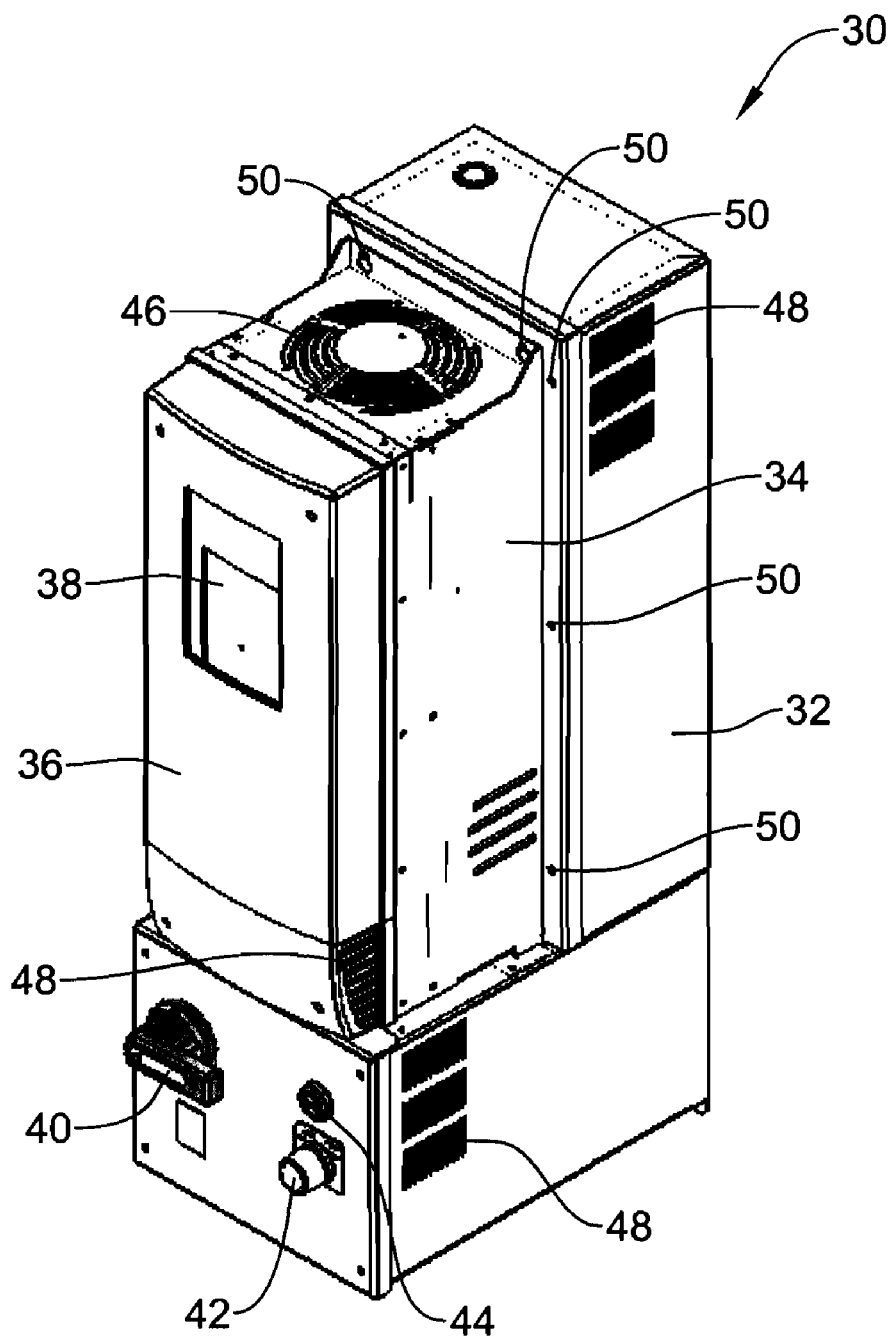
FIG. 2 is a perspective view of an illustrative embodiment of a drive control assembly.

FIG. 2 is a perspective view of another illustrative drive control assembly 30. The illustrative drive control assembly 30 includes a VFD module 34 and a bypass module 32. In the illustrative embodiment, the VFD module 34 includes a control module 36, including a control panel 38, such as the keypad, display, indicator lights and/or the like. In some cases, the control panel 38 may be provided remote from the VFD module 34, if desired. In the illustrative embodiment, the control module 34 is provided as a separate module, which is mounted to the VFD module 34 as shown. Thus, the control module 34 may be removed from the VFD module 34 without having to remove the VFD module 34 from the bypass module 32.

The illustrative VFD module 34 includes a cooling fan 46 positioned on the top of the VFD module 34. In many cases, the operation of the VFD module 34 can create a substantial amount of heat and it may be desirable to provide cooling to the VFD module 34 via the cooling fan 46. When provided, it is contemplated that the cooling fan 46 may be positioned in any suitable location in the VFD module 34 to provide cooling as desired. In some embodiments, the VFD module 34, and in some cases the bypass module 32, may include one or more vents 48 to vent heat from the drive control assembly 30.

The drive control assembly 30 shown in FIG. 2 also includes a selector lever 40, a selector dial or knob 42, and a button 48, which will be discussed in further detail with reference to FIGS. 5 and 6. These are only illustrative, however, and it is contemplated that any number and any type of control mechanism(s) may be used, as desired. These control mechanisms may control, at least in part, the power and operation of the illustrative drive control assembly 30. For example, the control mechanisms may control which of the VFD module 34 or bypass module 32 will provide control to the motor.

In the illustrative embodiment of the drive control assembly 30, the bypass module 32 is mountable to a wall and the VFD module 34 is mountable to the bypass module 32. The illustrative VFD module 34 may be secured or mounted to the bypass module 32 by one or more fasteners 50, such as for example, screws, bolts, clips, clamps, or any other suitable fastener 50 or combination thereof as desired. In the illustrative embodiment, the VFD module 34 is secured and mounted to the bypass module 32 by using multiple screws.

The illustrative bypass module 32 may include electrical components and/or software needed for bypass control of the motor. In the illustrative embodiment, the drive control assembly 30 may be mounted to a wall as an entire unit, or may be mounted in parts. In one embodiment, the VFD module 34 may be mounted to the bypass module 32 and then the drive control assembly 30 may be mounted to the wall. In another embodiment, the bypass module 32 may be mounted to the wall and then the VFD module 34 may be mounted to the bypass module 32.

Figure 3:
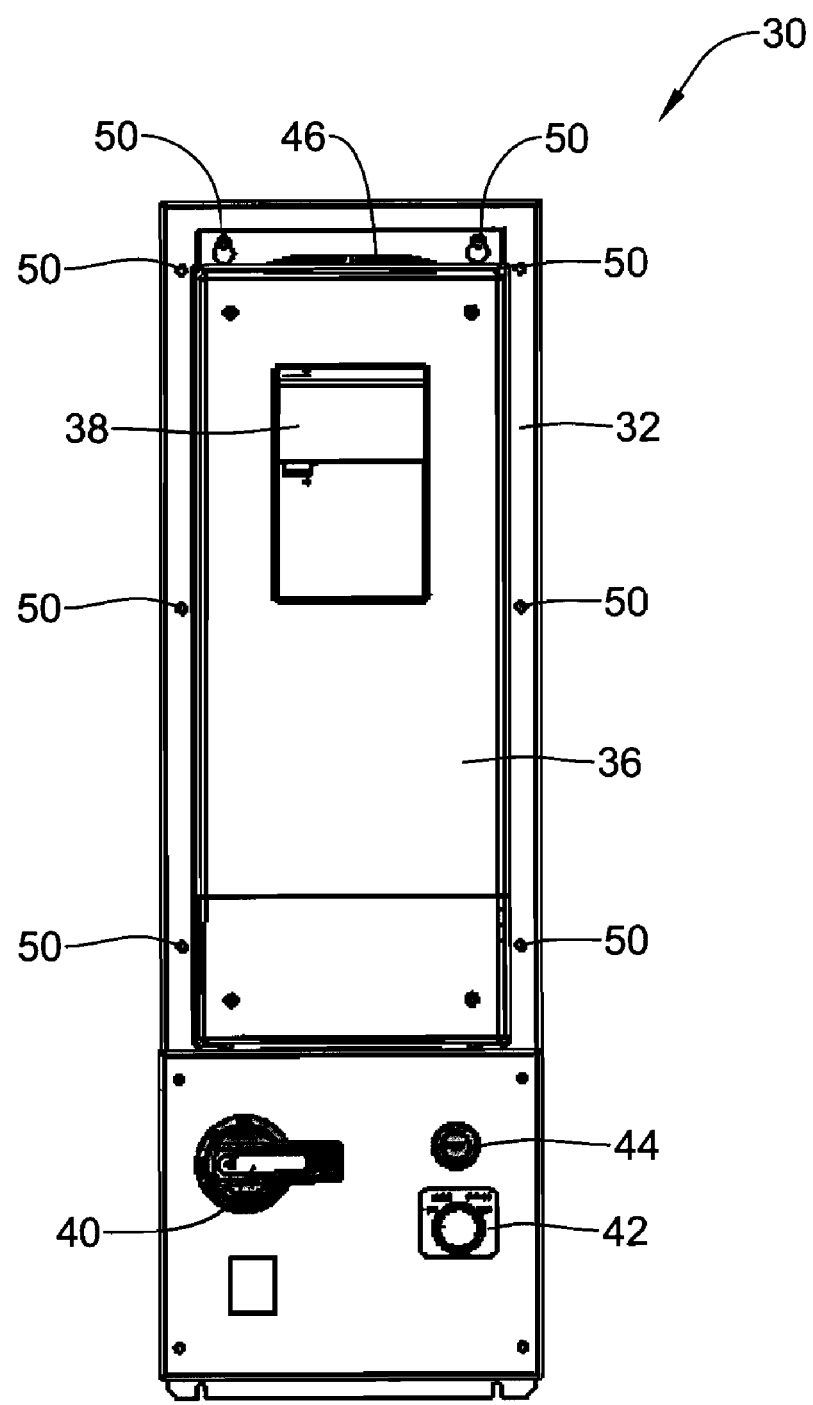
FIG. 3 is a perspective front view of the illustrative embodiment of the drive control assembly of FIG. 2.
Figure 4:
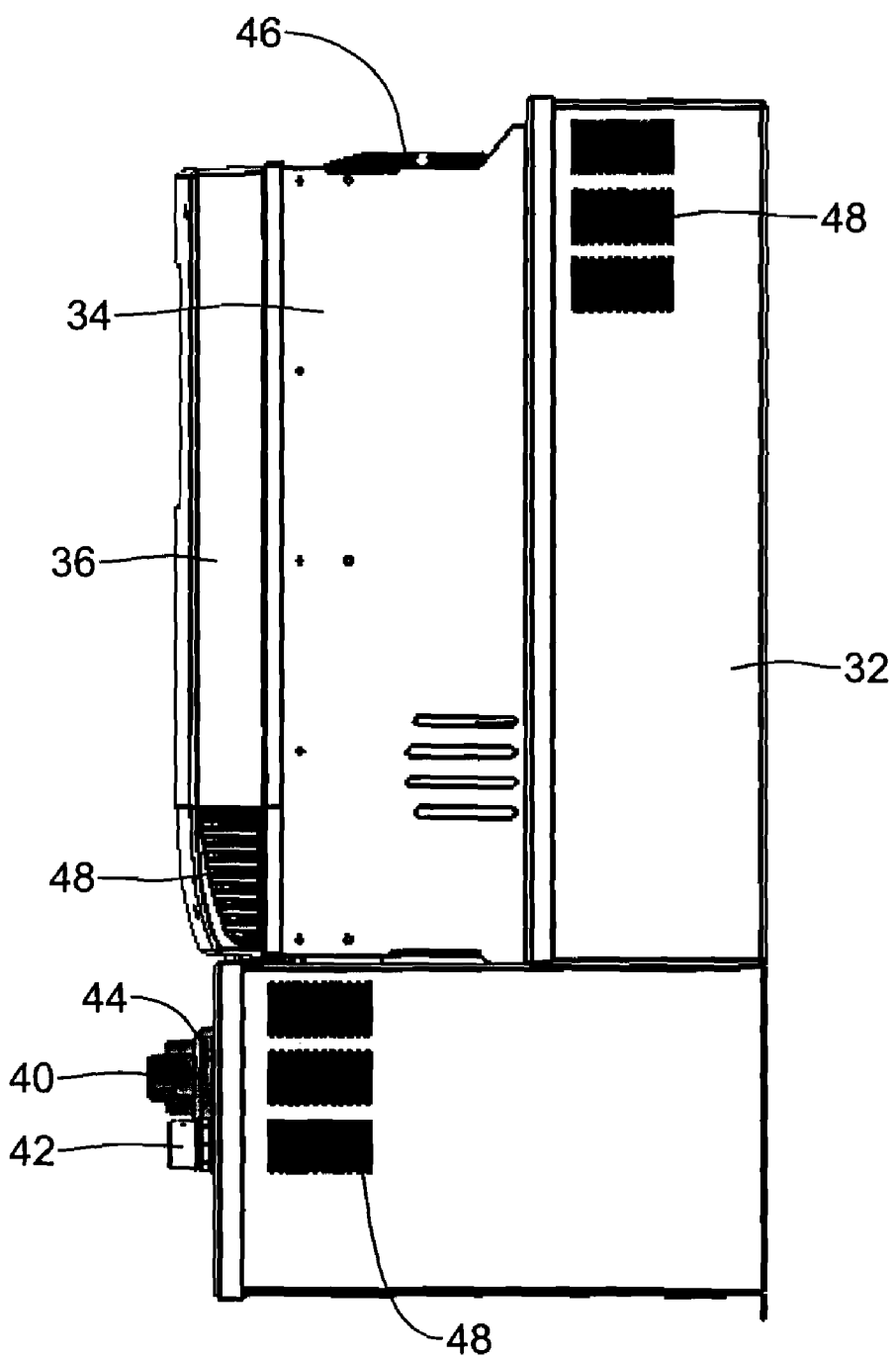
FIG. 4 is a perspective side view of the illustrative embodiment of the drive control assembly of FIG. 2.

FIG. 3 is a front perspective front view, and FIG. 4 is a perspective side view of the illustrative drive control assembly 30 of FIG. 2. As can be seen, the illustrative drive control assembly 30 includes the bypass module 32 with the VFD module 34 mounted to the bypass module 32. FIG. 3 illustrates the securing of the VFD module 34 to the bypass module 32 using a plurality of screws 50.

Figure 5:
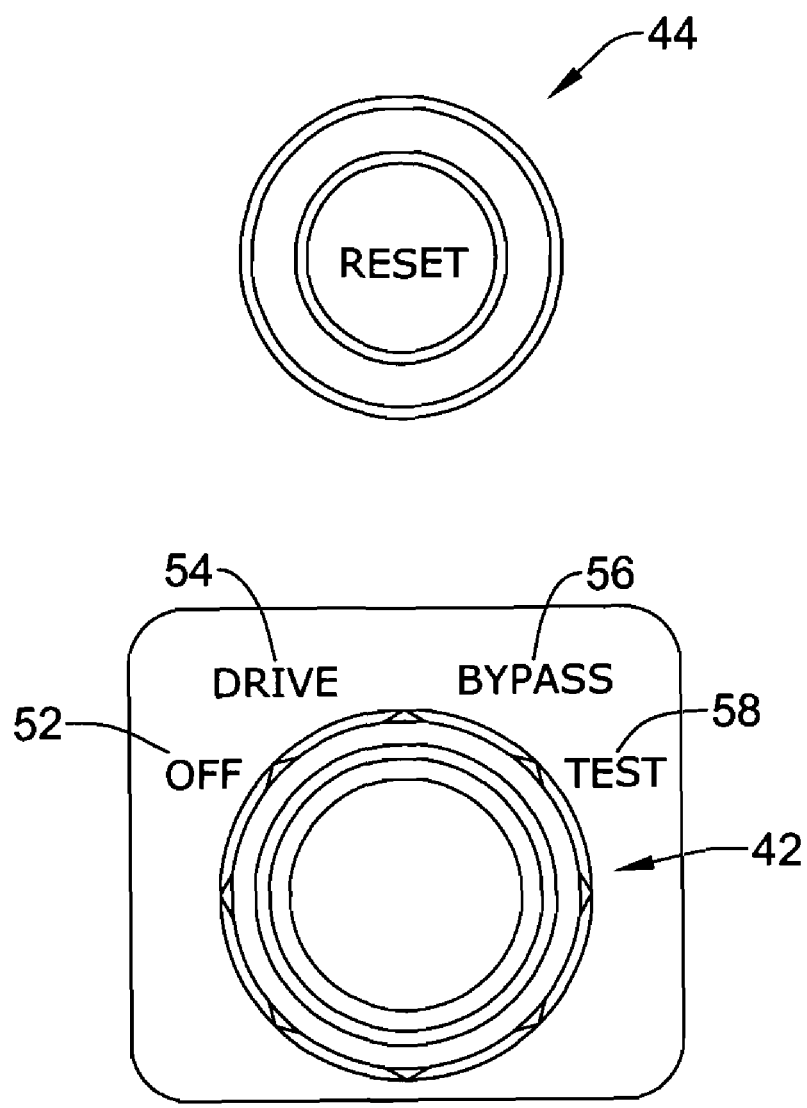
FIG. 5 is a perspective view of an illustrative selector dial and push button of the illustrative embodiment of the drive control assembly of FIG. 2.

FIG. 5 is a front perspective view of an illustrative selector dial 42 and push button 44 of the drive control assembly 30 of FIG. 2. The illustrative selector dial 42 can switch control for the motor between the VFD module 34 and the bypass module 32. In the illustrative embodiment, the selector dial 42 may control the switching of a mechanical switch, which can be a multi-position switch. The illustrative selector dial 42 has four positions: off 52, drive 54, bypass 56, and test 58. The first position of the selector dial 42, which corresponds to the off position 52, can switch off the power to the motor so that neither the VFD module 34 nor the bypass module 32 provides power to the motor. The second position of the selector dial 42, which corresponds to the drive position 54, enables the VFD module 34 to control the motor. The third position of the selector dial 42, which corresponds to the bypass position 56, enables the bypass module 32 to control the motor. The fourth position of the selector dial 42, which corresponds to the test position 58, may enable testing of the VFD module 34 without providing variable control to the motor. In essence, the fourth position 58 powers the VFD module 34 in order to test the operating ability of the VFD module 34, but does not provide a control signal to the motor.

While the illustrative selector dial 42 only includes a four position knob 52, 54, 56, and 58, any number of positions may be used, as desired, depending on the desired functionality. Furthermore, while a selector dial 42 is illustrated to switch a mechanical switch, any suitable switch mechanism, such as a lever, a button, a plurality of buttons, or any another suitable mechanism may be used as desired. Also, and as indicated above, it is contemplated that the switch may be an electrical or electromechanical switch (e.g. relay, Triac, transistor(s), etc.), which can be controlled electrically from a local or remote location, as desired.

The illustrative embodiment may also include a reset button 44 as shown, but this is not required. The reset button 44 may act similar to a circuit breaker, such that if the drive control assembly 30 experiences a power surge and trips a breaker, the reset button 44 can reset the breaker for the drive control assembly 30. Again, while a button 44 is illustrated, any suitable mechanism may be used, as desired.

Figure 6:
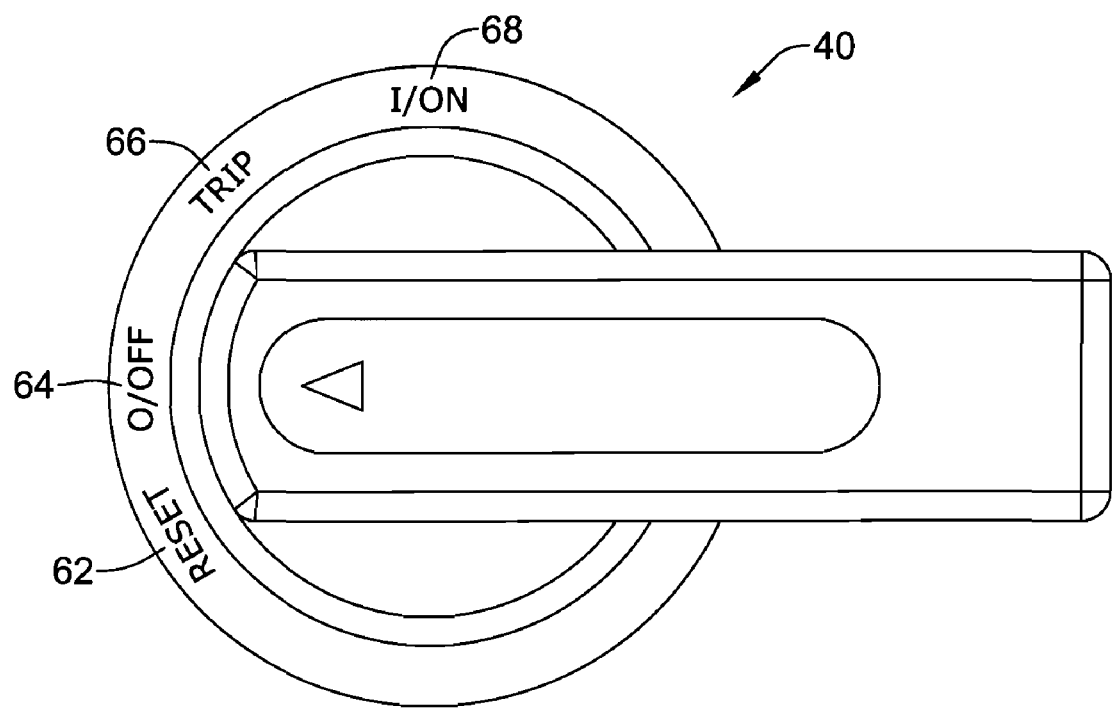
FIG. 6 is a perspective view of an illustrative selector lever of the illustrative embodiment of the drive control assembly of FIG. 2.

FIG. 6 is a front perspective view of an illustrative selector lever 40 of the drive control assembly 30 of FIG. 2. The illustrative selector lever 40 can function as a main disconnect for the drive control assembly 30. In the illustrative embodiment, the selector lever 40 has four positions: reset 62, off 64, trip 66, and on 68. The on position 68 may provide power to the drive control assembly 30. The off position 64 may turn off power to the drive control assembly 30. The trip position 66 may trip the drive control assembly 30. The reset position 62 may reset the power to the drive control assembly 30. While a four position 62, 64, 66, and 68 selector lever 40 is shown for the main disconnect, any suitable number of positions may be used, as desired. Additionally, it is contemplated that any suitable mechanism besides a lever, such as a switch, dial, button, or any other mechanism may be used as desired.

Figure 7:
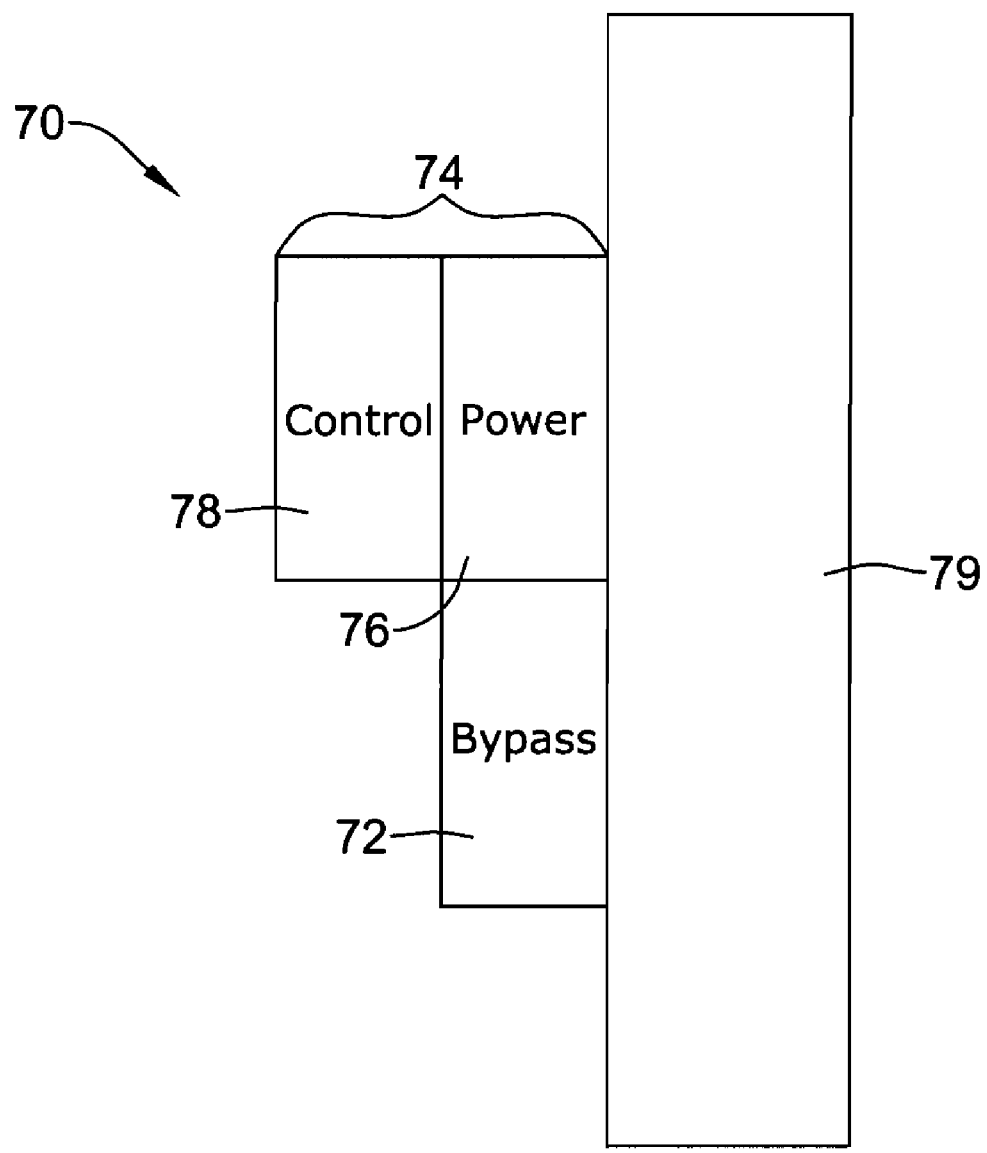
FIG. 7 is a schematic diagram of a side view of another illustrative embodiment of a drive control assembly.

FIG. 7 is a schematic diagram of a side view of another illustrative embodiment of a drive control assembly 70. Similar to above, the illustrative drive control assembly 70 includes a VFD module 74 and a bypass module 72. In this embodiment, the bypass module 72 may include a mechanical, electrical, and/or electromechanical switch to switch control between the VFD module 74 and the bypass module 72. The bypass module 72 may be mountable to a wall 79, and the VFD module 74, including a control module 78 and a power module 76, may be mounted above the bypass module 72. The VFD module 74 is electrically coupled to the bypass module 72 and may be mounted to either the wall 79 or the top of the bypass module 72. In this embodiment, the VFD module 74 may be removed from the drive control assembly 70 while leaving the bypass module 72 in place. The may allow the bypass module 72 to continue to control the motor when the VFD module 74 is removed.

Figure 8:
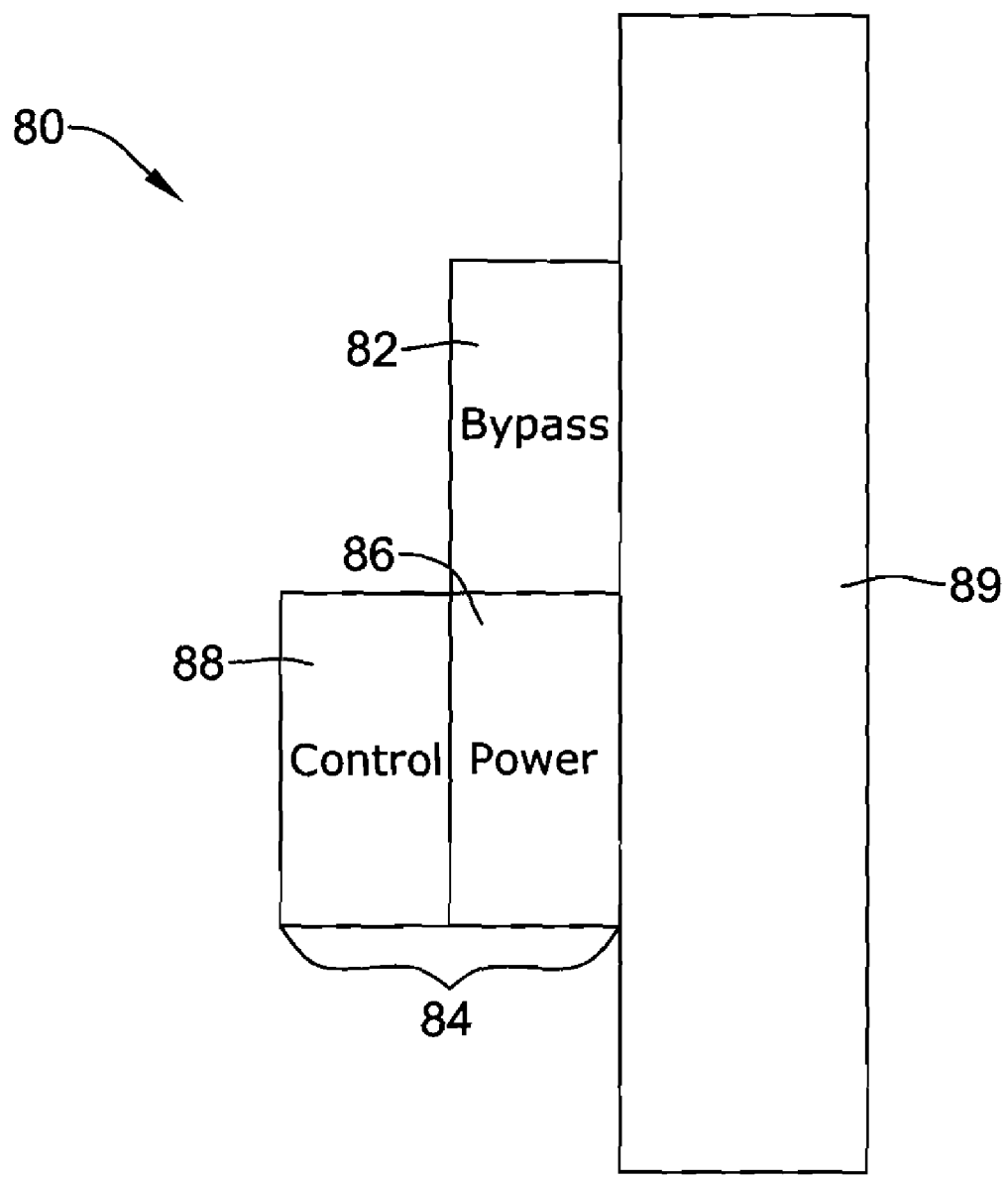
FIG. 8 is a schematic diagram of side view of another illustrative embodiment of a drive control assembly.

FIG. 8 is a schematic diagram of side view of another illustrative embodiment of a drive control assembly 80. Similar to above, the illustrative drive control assembly 80 includes a VFD module 84 and a bypass module 82. In this embodiment, the bypass module 82 may include a mechanical, electrical and/or electromechanical switch to switch control between the VFD module 84 and the bypass module 82. The bypass module 82 may be mounted to a wall 89 and the VFD module 84, including a control module 88 and a power module 86, may be mounted below the bypass module 82. The VFD module 84 is electrically coupled to the bypass module 82 and may be mounted to either the wall 89 or to the bottom of the bypass module 82. In this embodiment, the VFD module 84 may be removed from the drive control assembly 80 while leaving the bypass module 82 in place. The may allow the bypass module 82 to continue to control the motor when the VFD module 84 is removed.

Figure 9:
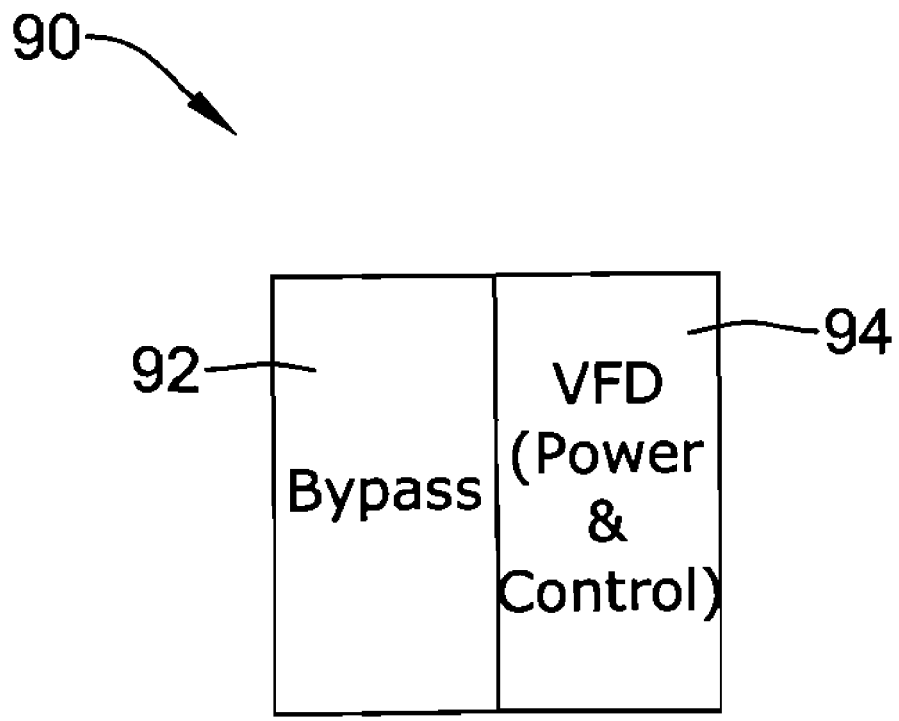
FIG. 9 is a schematic diagram of front view of another illustrative embodiment of a drive control assembly.

FIG. 9 is a schematic diagram of front view of another illustrative embodiment of a drive control assembly 90. Similar to above, the illustrative drive control assembly 90 includes a VFD module 94 and a bypass module 92. In this embodiment, the bypass module 92 may include a mechanical, electrical and/or electromechanical switch to switch control between the VFD module 94 and the bypass module 92. The bypass module 92 may be mounted to a wall and the VFD module 94 may be mounted beside the bypass module 92. The VFD module 94 is electrically coupled to the bypass module 92 and may be mounted to either the wall or to the side of the bypass module 92. In this embodiment, the VFD module 94 may be removed from the drive control assembly 90 while leaving the bypass module 92 in place. The may allow the bypass module 92 to continue to control the motor when the VFD module 94 is removed.

In each of the embodiments described above, the control module may be part of the VFD module, or separate from the VFD module. When provided as a separate control module, the control module may be mounted to the VFD module as shown in FIG. 2, mounted to the bypass module, mounted to the wall, or mounted at some remote location. In addition, it is contemplated that one control module may control more than one VFD and/or bypass modules, if desired.

Having thus described the preferred embodiments of the present invention, those of skill in the art will readily appreciate that yet other embodiments may be made and used within the scope of the claims hereto attached. Numerous advantages of the invention covered by this document have been set forth in the foregoing description. It will be understood, however, that this disclosure is, in many respect, only illustrative. Changes may be made in details, particularly in matters of shape, size, and arrangement of parts without exceeding the scope of the invention. The invention's scope is, of course, defined in the language in which the appended claims are expressed.

The invention claimed is:

1. A drive control assembly for a motor, the drive control assembly is configured to be mounted to a mounting surface, the drive control assembly comprising:
    a bypass module for providing bypass control for the motor, the bypass module having a first side facing towards the mounting surface, and a second opposing side facing away from the mounting surface;
    a variable frequency drive module for providing variable speed control for the motor, the variable frequency drive module removably mounted relative to the bypass module such that the variable frequency drive module extends from adjacent the second opposing side of the bypass module and in a direction away from the mounting surface, the variable frequency drive module is removable from the drive control assembly without removing the bypass module;

a switch for switching control for the motor between the variable frequency drive module and the bypass module, the variable frequency drive module is also removable from the drive control assembly without removing the switch; and wherein the bypass module provides control for the motor when the switch switches control for the motor to the bypass module, and wherein the bypass module can continue to provide control for the motor even when the variable frequency drive module is removed from the drive control assembly.

2. The drive control assembly of claim 1 wherein the switch has at least a first position and a second position, the first position providing control to the motor from the variable frequency drive module and the second position providing control to the motor from the bypass module.

3. The drive control assembly of claim 2 wherein the variable frequency drive module can be detached and removed from the drive control assembly while the drive control assembly still provides power to the motor via the bypass module when the mechanical switch is in the second position.

4. The drive control assembly of claim 1 wherein the bypass control of the bypass module drives the motor at full speed.

5. The drive control assembly of claim 1 wherein the bypass module is mounted to a wall and the variable frequency drive module is mounted to the bypass module.

6. The drive control assembly of claim 1 wherein the bypass module is mounted to a floor and the variable frequency drive module is mounted to the bypass module.

7. The drive control assembly of claim 1 wherein the variable frequency drive module includes a control module that controls the operation of the variable frequency drive module, the control module having a control panel for user input.

8. The drive control assembly of claim 7 wherein the variable frequency drive module has a first side facing the bypass module and a second opposing side facing away from the bypass module, and wherein the control panel is positioned adjacent the second opposing side of the variable frequency drive.

9. A drive control assembly for a motor, the drive control assembly is configured to be mounted to a mounting surface, the drive control assembly comprising:

a bypass module for providing bypass control for the motor, the bypass module having a first side facing towards the mounting surface, and a second opposing side facing away from the mounting surface;

a variable frequency drive module for providing variable speed control for the motor, the variable frequency drive module removably mounted relative to the bypass module such that the variable frequency drive module extends from adjacent the second opposing side of the bypass module and in a direction away from the mounting surface, the variable frequency drive module is removable from the drive control assembly without removing the bypass module;

wherein the bypass module is coupled to a power supply and to a motor drive output;

wherein the variable frequency drive module is electrically and mechanically connected to the bypass module; and wherein the variable frequency drive module is removable from the drive control assembly without removing the bypass module from the drive control assembly, wherein the bypass module can provide power to the motor even when the variable frequency drive module is removed.

10. The drive control assembly of claim 9 wherein the bypass module includes a switch having a first position and a second position, the first position providing control for the motor by the variable frequency drive module and the second position providing control for the motor by the bypass module.

11. The drive control assembly of claim 9 wherein the variable frequency drive module includes a control module that controls the operation of the variable frequency drive module, the control module having a control panel with a user interface.

12. The drive control assembly of claim 11 wherein the variable frequency drive module has a first side facing the bypass module and a second opposing side facing away from the bypass module, and wherein the control panel is positioned adjacent the second opposing side of the variable frequency drive.

13. The drive control assembly of claim 9 wherein the bypass module is mountable to a wall, and the variable frequency drive module is mechanically mounted to the bypass module.

14. A drive control assembly for a motor comprising:

a bypass module that provides bypass control for the motor, the bypass module mountable to a wall, the bypass module having a first side facing the wall and a second opposing side facing away from the wall;

a variable frequency drive module that provides variable speed control for the motor, the variable frequency drive module removably mounted to the bypass module such that the variable frequency drive module extends from adjacent the second opposing side of the bypass module and in a direction away from the mounting surface;

a switch for switching control for the motor between the variable frequency drive and the bypass module; and wherein the bypass module can provide control for the motor when the variable frequency drive module is removed from the drive control assembly.

* * * * *